US012466241B2

(12) United States Patent
Lee

(10) Patent No.: US 12,466,241 B2
(45) Date of Patent: Nov. 11, 2025

(54) SLIM-TYPE AIR VENT OF VEHICLE

(71) Applicant: NIFCO KOREA INC., Chungcheongnam-do (KR)

(72) Inventor: Su Young Lee, Chungcheongnam-do (KR)

(73) Assignee: NIFCO KOREA INC., Chungcheongnam-Do (KR)

( * ) Notice: Subject to any disclaimer, the term of this patent is extended or adjusted under 35 U.S.C. 154(b) by 737 days.

(21) Appl. No.: 17/784,391

(22) PCT Filed: Oct. 19, 2020

(86) PCT No.: PCT/KR2020/014276
§ 371 (c)(1),
(2) Date: Dec. 5, 2022

(87) PCT Pub. No.: WO2021/118038
PCT Pub. Date: Jun. 17, 2021

(65) Prior Publication Data
US 2024/0227510 A1 Jul. 11, 2024

(30) Foreign Application Priority Data
Dec. 11, 2019 (KR) .................. 10-2019-0165037

(51) Int. Cl.
*B60H 1/34* (2006.01)
(52) U.S. Cl.
CPC ... *B60H 1/3421* (2013.01); *B60H 2001/3471* (2013.01)
(58) Field of Classification Search
CPC .............. B60H 1/3421; B60H 2001/3471
(Continued)

(56) References Cited

U.S. PATENT DOCUMENTS 10,266,032 B2 * 4/2019 Lim ..................... B60H 1/0065
10,414,246 B2 * 9/2019 Shibata ............... B60H 1/3421
(Continued)

FOREIGN PATENT DOCUMENTS

DE  202014104226 U1  12/2014
DE  102016122138 A1  5/2018
(Continued)

OTHER PUBLICATIONS

German Office Action, Application No. 112020006033.0, dated Oct. 18, 2022, 5 pages.
(Continued)

*Primary Examiner* — Avinash A Savani
*Assistant Examiner* — Dana K Tighe
(74) *Attorney, Agent, or Firm* — Stinson LLP

(57) ABSTRACT

The present invention relates to a slim-type air vent of a vehicle. More specifically, the present invention can easily change a flow channel of air, which is discharged toward an exit through an outflow part of a duct, by means of each rotation relative to a hinge, according to a rotation state of a knob. The present invention comprises: a duct having an inflow part through which air is introduced and an outflow part enlarged compared with the inflow part and formed to communicate therewith; a vane device for controlling the direction and the volume of the air discharged through an exit formed in the outflow part of the duct; and a knob for providing a driving force such that the vane device rotates about a hinge.

7 Claims, 6 Drawing Sheets

(58) Field of Classification Search
USPC .................................................. 454/154, 155
See application file for complete search history.

(56) References Cited

U.S. PATENT DOCUMENTS

| | | | |
|---|---|---|---|
| 10,792,981 B2 | 10/2020 | Lee et al. | |
| 10,792,982 B2 | 10/2020 | Lee et al. | |
| 10,981,435 B2* | 4/2021 | Gareis .................. | B60H 1/3421 |
| 2016/0200178 A1 | 7/2016 | Londiche et al. | |
| 2017/0158029 A1 | 6/2017 | Eltrop | |
| 2020/0094656 A1* | 3/2020 | Kim ..................... | B60H 1/3421 |

FOREIGN PATENT DOCUMENTS

| | | |
|---|---|---|
| KR | 101878965 B1 | 8/2018 |
| KR | 20180089768 A | 8/2018 |
| KR | 20190034732 A | 4/2019 |
| KR | 1020190130331 A | 11/2019 |

OTHER PUBLICATIONS

First Office Action, and translation thereof, from CN Application No. 2020086140.9, dated Mar. 1, 2025, 14 pages.

* cited by examiner

SLIM-TYPE AIR VENT OF VEHICLE

This application is a national stage application of PCT/KR2020/014276, filed Oct. 19, 2020, which claims priority to Korean application 10-2019-0165037, filed Dec. 11, 2019, the entire contents of which are incorporated herein by reference for all purposes.

TECHNICAL FIELD

The present invention relates to a slim-type air vent of a vehicle. More specifically, the present invention relates to a slim-type air vent of a vehicle that can easily change a flow channel of air, which is discharged toward an exit through an outflow part of a duct, by means of each rotation relative to a hinge, according to a rotation state of a knob.

BACKGROUND

In general, due to the increase in size of a cluster and AVN (Audio, Video, Navigation) devices mounted inside automobiles, the location of installation of the air vent that discharges air according to the operation of the air conditioner and heater is moved to the lower area of the center fascia panel. In particular, there is a trend that the design of the appearance of the air vent is getting slim.

Generally, the air vent includes a center air vent mounted on a center fascia panel between the driver's seat and the front passenger's seat, and side vents mounted on a crash pad in front of the driver's seat and front passenger's seat, etc.

Attached FIG. 1 shows an appearance of a center air vent of conventional air vents.

As shown in FIG. 1, a plurality of horizontal wings 11 and vertical wings 12 are each rotatably mounted at the exit of a duct 10, and a wind direction control knob 13 for adjusting the vertical angle of the horizontal wings 11 and the horizontal angle of the vertical wings 12 is mounted in one of the plurality of horizontal wings 11.

In addition, a damper adjustment knob 14 is mounted rotatably at a position right next to the exit of the duct 10.

These conventional air vents adopt at least 6 horizontal and vertical wings, respectively, and thus have a wider structure. As such, there may be no problem with them in that the flow of air can be adjusted toward the body of a passenger (bottom: belly button, top: face), but because they are big in size, they have many problems, such as a package problem with surrounding parts and design restrictions.

Moreover, since the conventional air vent as above has a structure in which a plurality of horizontal and vertical wings are inevitably exposed, it occupies a large mounting space in the center fascia panel or crash pad, thereby eventually limiting the degree of design freedom on the cluster, AVNs placed around air vents, etc.

Accordingly, in order to improve the degree of design freedom on the cluster, AVN devices, etc., a slim type air vent in which only a single horizontal wing is exposed to the outside is adopted.

The slim air vent adopts a slim duct that is wider but shorter than the conventional air vent, so it does not occupy a large installation area, and accordingly, it can provide the advantage of improving the degree of design freedom on surrounding parts (such as the cluster, AVN devices, etc.), but since it is mounted at the exit of the slim duct and only a single horizontal wing is exposed to the outside, it is not possible to easily adjust the flow direction of the air discharged into the vehicle up and down, and not only that, it reduces the aesthetics of the interior of the vehicle, thereby reducing the vehicle's marketability.

SUMMARY

The present invention was devised to solve such conventional problems as above, and the present invention is designed to provide a slim-type air vent of a vehicle to facilitate an easy assembly of a vane device in a duct, thereby easily changing a flow channel of air that is discharged toward an exit through an outflow part of a duct by means of each rotation relative to a hinge, according to a rotation state of a knob, while easily changing a flow channel of air that is introduced into an inflow part of the duct by means of the rotation of the vane device relative to a hinge according to the rotation state of the knob.

To achieve the objects above, the present invention comprises: a duct 200 having an inflow part 210 through which air is introduced and an outflow part 220 enlarged compared with the inflow part 210 and formed to communicate therewith: a vane device 100 for controlling the direction and the volume of the air discharged through an exit 221 formed in the outflow part 220 of the duct 200; and a knob 110 for providing a driving force such that the vane device 100 rotates about a hinge H.

Meanwhile, we would like to make it clear that the vane device 100 is composed of: a front vane link 120 in which the middle part of the connecting part 111 of the knob 110 is rotatably coupled around a hinge H: a rear vane link 130 in which the end of the connecting part 111 where the middle part is rotatably coupled to the front vane link 120 around a hinge H is rotatably connected to the middle part around a hinge H: an upper front vane 140 and a lower front vane 150 in which one end is rotatably coupled to the upper end and lower end of the rear vane link 130 around a hinge H, and the upper end and the lower end of the front vane link 120 are rotatably connected around a hinge H in a middle part: an upper rear vane 160 and a lower rear vane 170 in which one end is rotatably coupled to the other end of the lower front vane 150 and the upper front vane 140 around a hinge H; and a spacer 180 in which the other front and rear ends of the lower rear vane 170 and the upper rear vane 160 are rotatably coupled to the other part around a hinge H, and one front and rear ends of the upper front vane 140 and the lower front vane 150 are rotatably coupled to one part around a hinge H.

Further, a bezel 300 is fixedly installed at the exit 221 of the duct 200.

Meanwhile, we would like to make it clear that several vertical wings 190 connected by a vane link 400 are installed between the upper rear vane 160 and the lower rear vane 170, wherein a coupling hole 191 where a coupling protrusion 121 extending from the front vane link 120 is fit coupled is formed to pass through in any one of the vertical wings 190.

Meanwhile, we would like to make it clear that the upper and lower ends of the vertical wing 190 are rotatably coupled to a front upper spacer 500 and a front lower spacer 600 around a hinge shaft 192, wherein the front upper spacer 500 and the front lower spacer 600 are fixedly coupled to the lower rear vane 170 and the upper rear vane 160, respectively.

Further, we would like to make it clear that a guide hole 181 is formed to pass through in the other upper and lower parts of the spacer 180, such that a hinge H formed on the other front and rear ends of the lower rear vane 170 and the upper rear vane 160 is guided so as to rotate while moving.

According to the present invention, a bezel is combined toward the exit of a duct in a state where a vane device has been inserted into the duct, wherein the vane device can easily change a flow channel of air which is discharged toward an exit of a duct by means of the respective rotations of an upper front vane and an upper rear vane, and a lower front vane and a lower rear vane relative to a hinge according to a rotation state of a knob; thanks to this, a person in a vehicle can easily control the flow of air upwards or downwards that enters the vehicle through the duct by controlling the knob, and not only that, it can express the simple aesthetics of a slim air vent in appearance.

DETAILED DESCRIPTION

Hereinafter, the technical features of the present invention will be described in detail with reference to the accompanying drawings.

Figure 1:
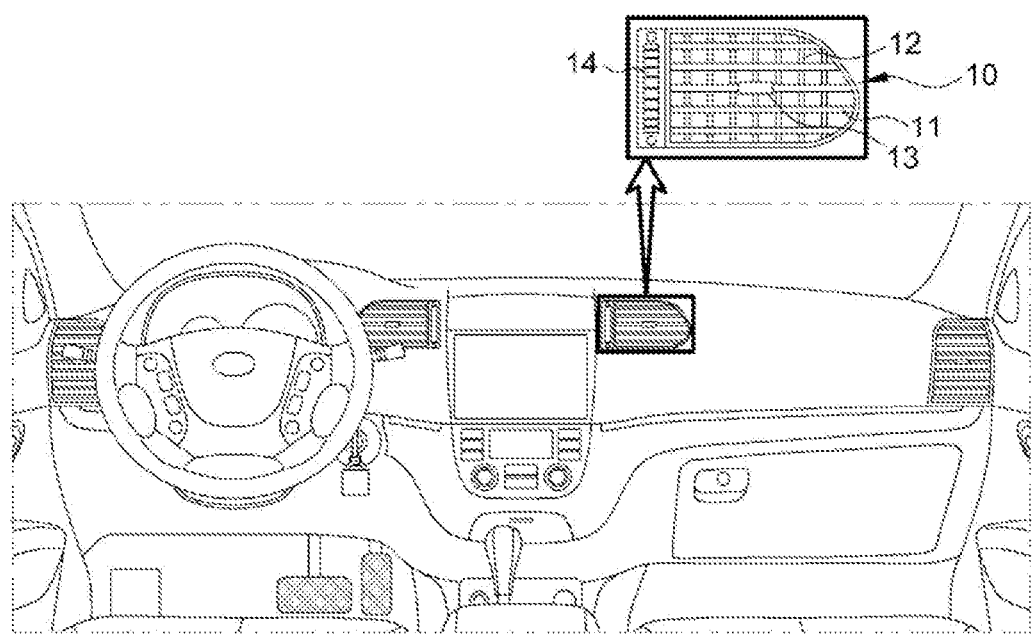
FIG. 1 is a schematic view showing an air vent for a conventional vehicle
Figure 2:
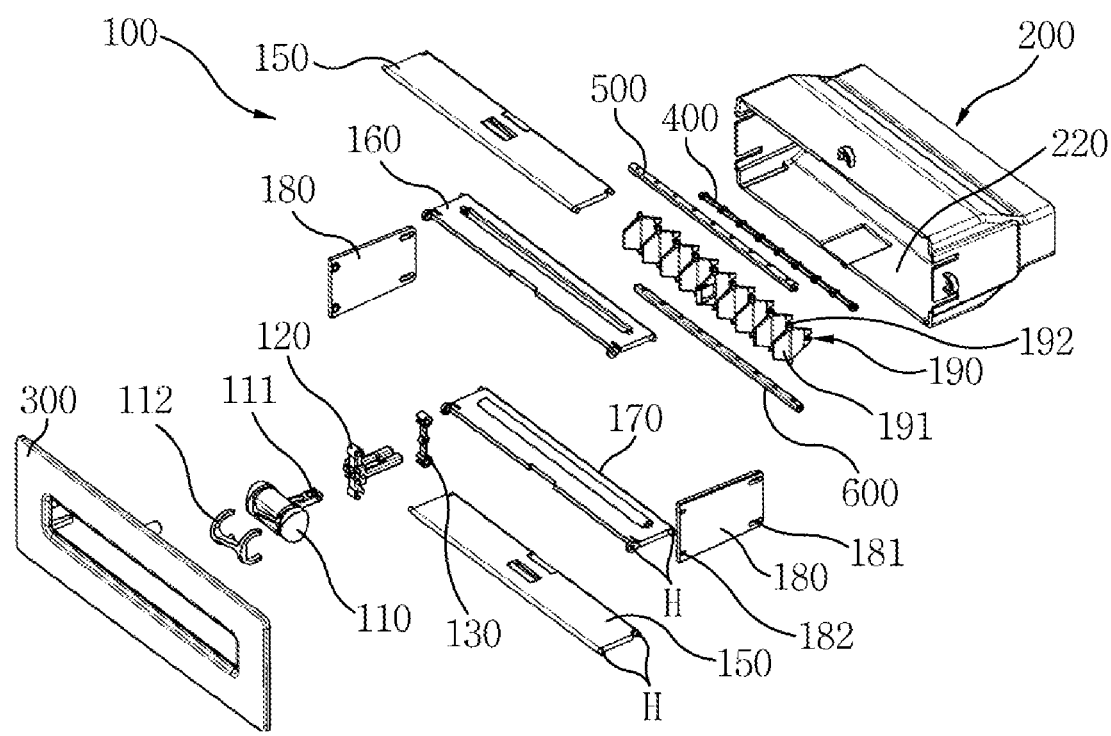
FIG. 2 is an exploded perspective view showing the configuration of a vane device for a slim-type air vent of a vehicle according to the present invention.
Figure 3:
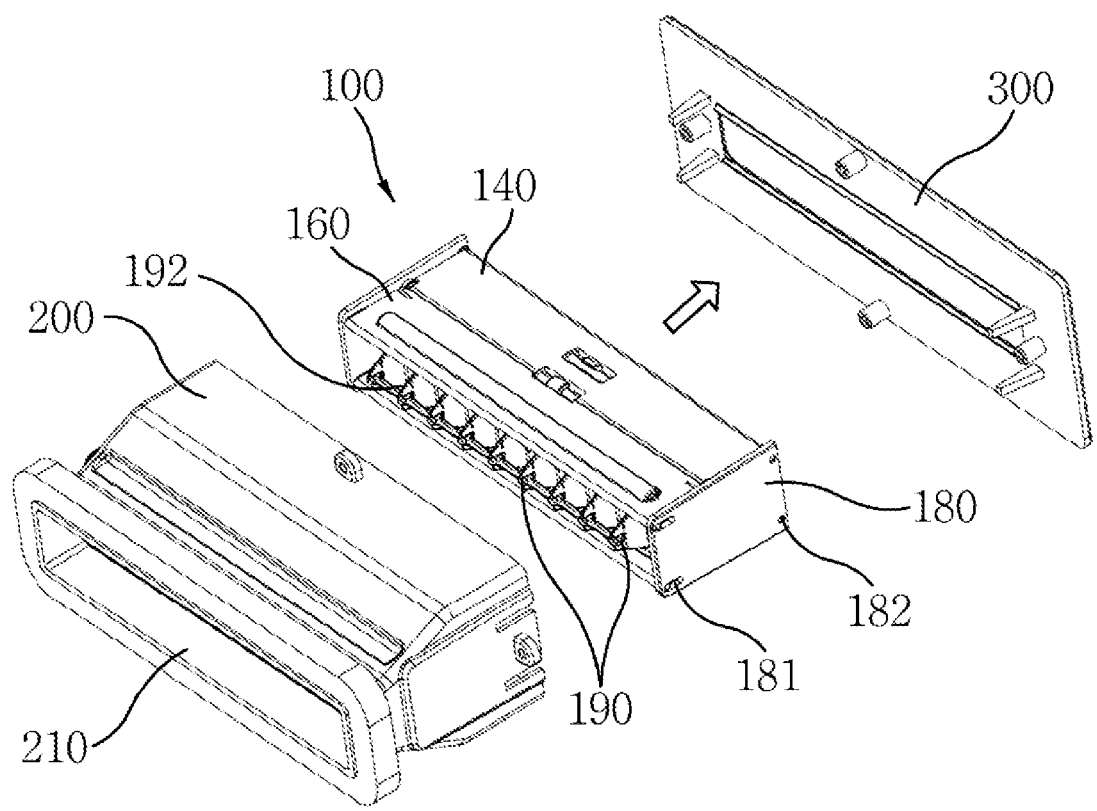
FIG. 3 is an exploded perspective view showing a state in which the vane device for a slim-type air vent of the present invention is assembled in a duct.
Figure 4:
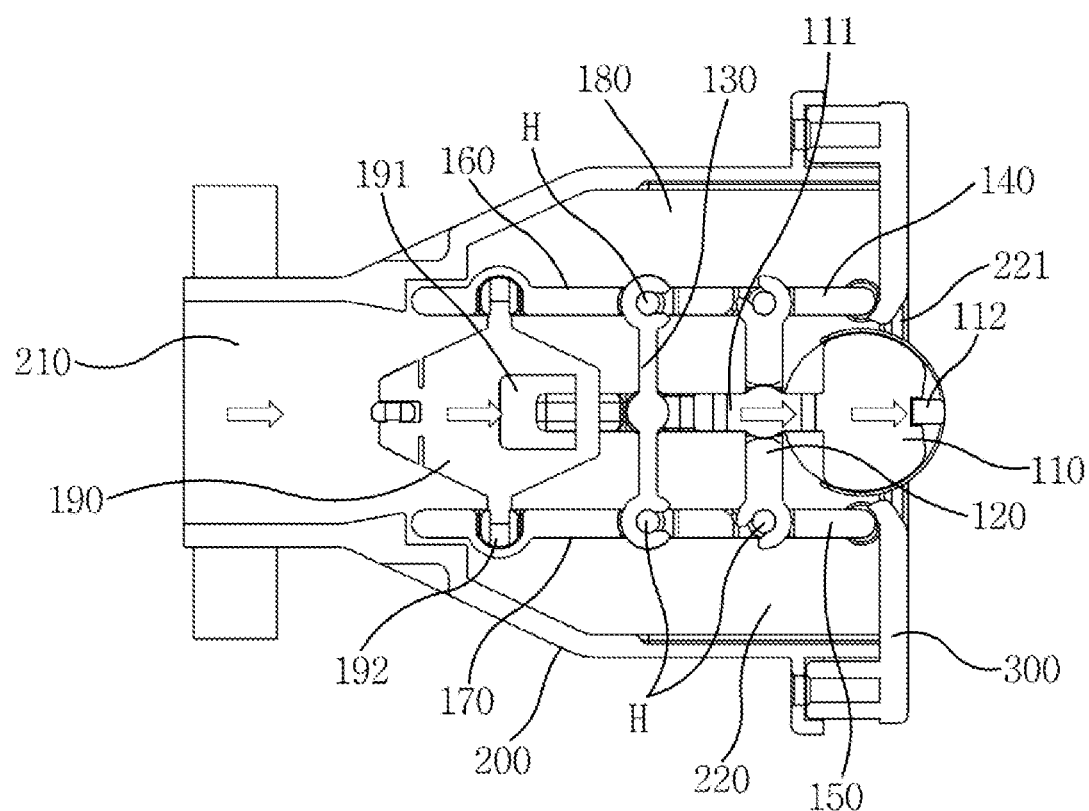
FIG. 4 is a cross-sectional view showing a state in which the vane device for a slim-type air vent of the present invention has been assembled in a duct.
Figure 5:
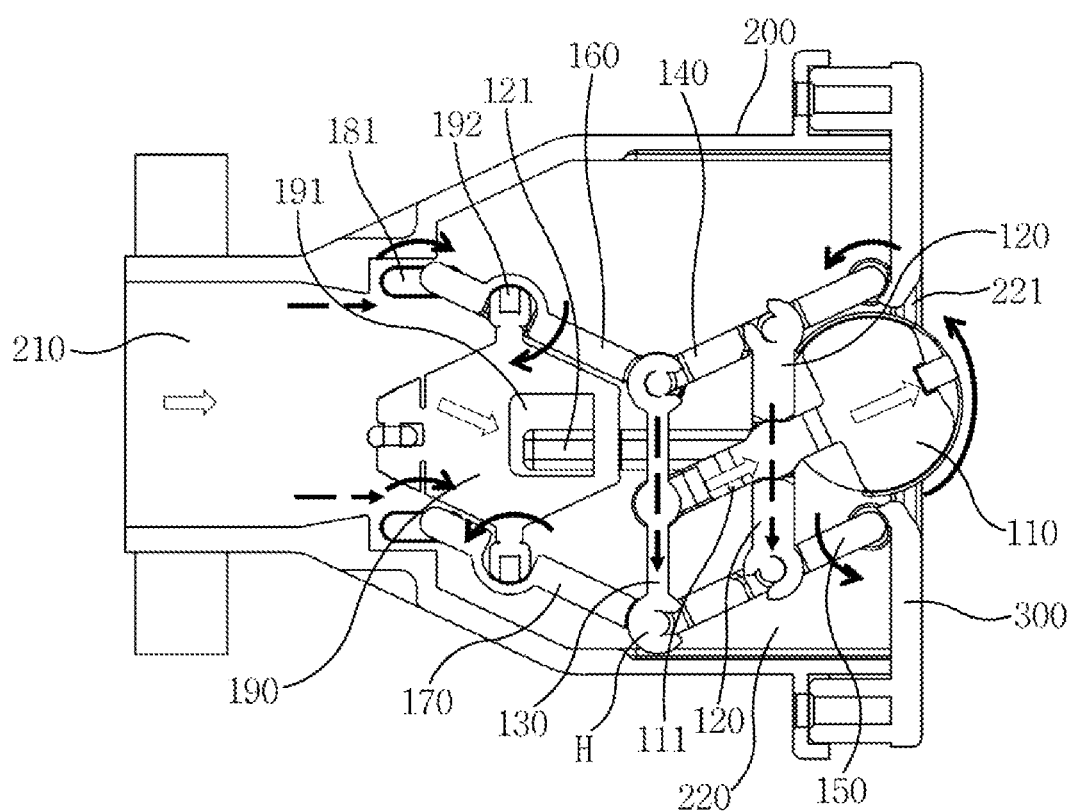
FIG. 5 is a cross-sectional view showing a state in which the vane device for a slim-type air vent of the present invention is operated so that air is discharged in an upper direction.
Figure 6:
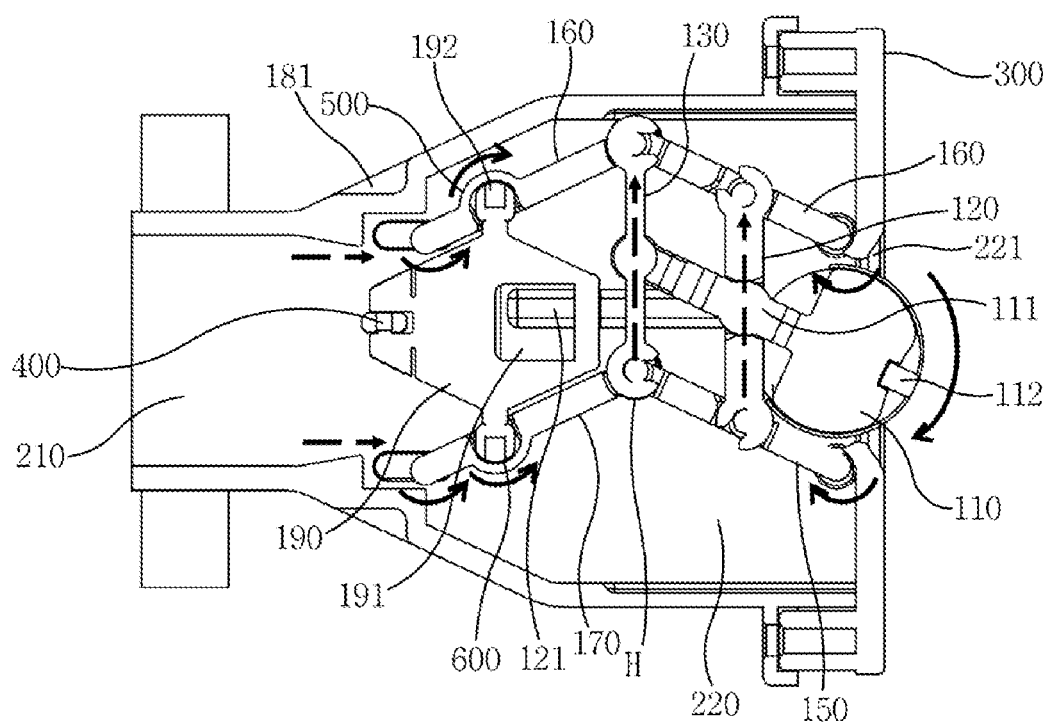
FIG. 6 is a cross-sectional view showing a state in which the vane device of a slim-type air vent of a vehicle of the present invention is operated so that air is discharged in a lower direction.

FIG. 2 is an exploded perspective view showing the configuration of a vane device for a slim-type air vent of a vehicle according to the present invention: FIG. 3 is an exploded perspective view showing a state in which the vane device for a slim-type air vent of the present invention is assembled in a duct: FIG. 4 is a cross-sectional view showing a state in which the vane device for a slim-type air vent of the present invention has been assembled in a duct: FIG. 5 is a cross-sectional view showing a state in which the vane device for a slim-type air vent of the present invention is operated so that air is discharged in an upper direction: and FIG. 6 is a cross-sectional view showing a state in which the vane device of a slim-type air vent of a vehicle of the present invention is operated so that air is discharged in a lower direction.

As illustrated in FIGS. 2 to 6, the slim-type air vent of a vehicle according to the present invention is composed of a duct 200 having an inflow part 210 through which air is introduced and an outflow part 220 enlarged compared with the inflow part 210 and formed to communicate therewith; a vane device 100 for controlling the direction and the volume of the air discharged through an exit 221 formed in the outflow part 220 of the duct 200; and a knob 110 for providing a driving force such that the vane device 100 rotates about a hinge H.

Meanwhile, the vane device 100 is composed of: a front vane link 120 in which the middle part of the connecting part 111 of the knob 110 is rotatably coupled around a hinge H: a rear vane link 130 in which the end of the connecting part 111 where the middle part is rotatably coupled to the front vane link 120 around a hinge H is rotatably connected to the middle part around a hinge H: an upper front vane 140 and a lower front vane 150 in which one ends are rotatably coupled to the upper end and lower end of the rear vane link 130 around a hinge H, and the upper end and the lower end of the front vane link 120 are rotatably connected around a hinge H in a middle part: an upper rear vane 160 and a lower rear vane 170 in which one ends are rotatably coupled to the other end of the lower front vane 150 and the upper front vane 140 around a hinge H: and a spacer 180 in which the other front and rear ends of the lower rear vane 170 and the upper rear vane 160 are rotatably coupled to the other part around a hinge H, and one front and rear ends of the upper front vane 140 and the lower front vane 150 are rotatably coupled to one part around a hinge H.

Meanwhile, a deco 112 is coupled to the front of the knob 110, and the connecting part 111 is formed protruding from the rear of the knob 110, wherein the middle part of the front vane link 12 is rotatably coupled to a middle part around a hinge H, and the middle part of the rear vane link 130 is rotatably coupled around a hinge H at an end, respectively.

In addition, the duct 200 has an inflow part 210 through which air is introduced and an outflow part 220 enlarged compared with the inflow part 210 and formed to communicate therewith.

Meanwhile, a bezel 300 is fixedly installed at an exit 221 that is formed at the outflow part 220 of the duct 200.

In addition, several vertical wings 190 connected by a vane link 400 are installed between the upper rear vane 160 and the lower rear vane 170, wherein a coupling hole 191 where a coupling protrusion 121 extending from the front vane link 120 is fit coupled is formed to pass through in any one of the vertical wings 190.

Meanwhile, the upper and lower ends of the vertical wing 190 are rotatably coupled to a front upper spacer 500 and a front lower spacer 600 around a hinge shaft 192, wherein the front upper spacer 500 and the front lower spacer 600 are fixedly coupled to the lower rear vane 170 and the upper rear vane 160, respectively.

Meanwhile, a guide hole 181 is formed to pass through in the other upper and lower parts of the spacer 180, such that a hinge H formed on the other front and rear ends of the lower rear vane 170 and the upper rear vane 160 is guided so as to rotate while moving.

In addition, a deco 112 is coupled to the front of the knob 110 to improve the exterior beauty of the knob 110, so that the interior appearance of the vehicle may be further improved.

According to the present invention as shown above, the middle part of the connecting part 111 of the knob 110 where a deco 112 is coupled at the front is rotatably coupled to the middle part of the front vane link 120 around a hinge H, and the middle part of the rear vane link 130 is rotatably coupled around a hinge H at an end of the connecting part 110 of the knob 111.

Meanwhile, the middle part of the upper front vane 140 is rotatably coupled to the upper end of the front vane link 120 around a hinge H, and the middle part of the lower front vane 150 is rotatably coupled to the lower end of the front vane link 120 about the hinge H.

In addition, the other ends of the lower front vane 150 and the upper front vane 140 are rotatably coupled to the upper end and the lower end of the rear vane link 130 about a hinge (H), respectively, and one ends of the lower rear vane 170 and the upper rear vane 160 are rotatably coupled to the other ends of the lower front vane 150 and the upper front vane 140 around the hinge H, respectively.

Meanwhile, a lower spacer 180 and an upper spacer 180 are installed in the middle parts of the lower rear vane 170 and the upper rear vane 160, respectively, and in the lower spacer 180 and the upper spacer 180, several vertical wings 190 connected by a vane link 400 are rotatably coupled around a hinge shaft 192.

Here, a coupling projection 121 formed in the front vane link 120 remains inserted in the coupling hole 191 formed in any one of the vertical wings 190.

In addition, the other front and rear ends of the lower rear vane 170 and the upper rear vane 160 installed with the lower spacer 180 and the upper spacer 180 are inserted into guide holes 181 formed to pass through in one upper and lower parts of the spacer 180, respectively, such that they slide along the guide hole 181 and at the same time can rotate around the hinge shaft 192, and one ends of an upper front vane 140 and a lower front vane 150 are rotatably inserted into connecting holes 182 formed in the other upper and lower parts of the spacer 180 around the hinge H, thereby completing the assembly of the vane device 100.

After assembling the vane device 100 as described above, the knob 110 where a deco is coupled is inserted into the duct 200, so as to be located at an exit 221 formed in the outflow part 220 of the duct 200, and then a bezel 300 is coupled toward the direction of the exit 221, thereby completing the installation of an air vent inside a vehicle.

Thanks to this, when a passenger in the vehicle rotates the knob 110 upwards, the connecting part 111 moves downward of the duct 200 as shown in FIG. 5, by means of which the upper rear vane 160, the lower rear vane 170, the upper front vane 140, and the lower front vane 150 each rotate around the hinge H, thereby changing the internal flow channel of the air vent upwards, and as described in FIG. 6, when the knob 110 is rotated upwards, the connecting part 111 is moved in the upper direction of the air duct 200, so that the upper rear vane 160, the lower rear vane 170, the upper front vane 140, and the lower front vane 150 are each rotated around the hinge H, changing the internal flow channel of the air vent downwards.

Here, the hinge H formed at the other ends of the upper rear vane 160 and the lower rear vane 170 is operated, such that it moves forward and backward along the guide hole 181 formed in the spacer 180 while rotating so as to supply air that enters the vehicle through the exit of the air duct 200 upwards or downwards.

EXPLANATION OF REFERENCE NUMERALS

100: vane device
110: knob
111: connecting part
120: front vane link
130: rear vane link
140: upper front vane
150: lower front vane
160: upper rear vane
170: lower rear vane
180: spacer
200: duct
210: inflow part
220: outflow part
221: exit
300: bezel

The invention claimed is:

1. A slim-type air vent of a vehicle comprising:
   a duct having an inflow part through which air can be introduced and an outflow part enlarged compared with the inflow part wherein the inflow part and the outflow part are in communication with each other;
   a vane device for controlling the direction and the volume of the air discharged through an exit formed in the outflow part of the duct; and
   a knob for providing a driving force such that the vane device rotates about a hinge, wherein the vane device comprises:
      a front vane link to which a middle part of a connecting part of the knob is rotatably coupled around the hinge;
      a rear vane link to which an end of the connecting part of the knob is rotatably connected to the middle part of the rear vane link around the hinge;
      an upper front vane and a lower front vane wherein one end of the upper front vane and the lower front vane is rotatably coupled to the upper end and lower end of the rear vane link around the hinge, and the upper end and the lower end of the front vane link are rotatably connected around the hinge in a middle part of the upper front vane and the lower front vane;
      an upper rear vane and a lower rear vane wherein one end of the upper rear vane and the lower rear vane is rotatably coupled to an end of the lower front vane and the upper front vane around the hinge; and
      a spacer wherein the front and rear ends of the lower rear vane and the upper rear vane are rotatably coupled to one end of the spacer around the hinge, and the front and rear ends of the upper front vane and the lower front vane are rotatably coupled to the other end of the spacer around the hinge.

2. The slim-type air vent of the vehicle according to claim 1, further comprising a bezel that is fixedly installed at the exit of the duct.

3. The slim-type air vent of the vehicle according to claim 1, further comprising a plurality of vertical wings connected to each other by a vane link connected between the upper rear vane and the lower rear vane, wherein a coupling hole is located in one or more of the vertical wings and is configured to allow a coupling protrusion extending from the front vane link to pass through one or more of the vertical wings.

4. The slim-type air vent of the vehicle according to claim 3, wherein the upper and lower ends of the vertical wing are rotatably coupled to a front upper spacer and a front lower spacer around a hinge shaft, wherein the front upper spacer and the front lower spacer are fixedly coupled to the lower rear vane and the upper rear vane, respectively.

5. The slim-type air vent of the vehicle according to claim 1, further comprising a guide hole configured to pass through upper and lower parts of the spacer, such that the hinge formed on the other front and rear ends of the lower rear vane and the upper rear vane is capable of rotating while moving.

6. The slim-type air vent of the vehicle according to claim 1, further comprising a deco that is coupled to the front of the knob.

7. The slim-type air vent of the vehicle according to claim 1, wherein the connecting part of the knob protrudes at the rear of the knob, wherein the middle part of the front vane link is rotatably coupled to a middle part of the connecting part around the hinge, and the middle part of the rear vane link is rotatably coupled around the hinge at an end of the connecting part, respectively.

* * * * *